United States Patent
Alonazy

(10) Patent No.: US 9,337,951 B2
(45) Date of Patent: May 10, 2016

(54) DEVICE AND METHOD FOR LIMITING AN EXTENT OF A WIRELESS NETWORK SERVICE

(71) Applicant: Yousef Dhahi Alonazy, Indiana, PA (US)

(72) Inventor: Yousef Dhahi Alonazy, Indiana, PA (US)

( * ) Notice: Subject to any disclaimer, the term of this patent is extended or adjusted under 35 U.S.C. 154(b) by 5 days.

(21) Appl. No.: 14/448,741

(22) Filed: Jul. 31, 2014

(65) Prior Publication Data

US 2016/0036557 A1  Feb. 4, 2016

(51) Int. Cl.
*H04M 1/66* (2006.01)
*H04K 3/00* (2006.01)
*H04W 28/02* (2009.01)

(52) U.S. Cl.
CPC .. *H04K 3/43* (2013.01); *H04K 3/45* (2013.01); *H04W 28/0226* (2013.01)

(58) Field of Classification Search
CPC ..... H04K 3/22; H04K 2203/36; H04K 3/228; H04K 3/43; H04K 3/825; H04W 12/02
USPC ................................. 455/410, 411
See application file for complete search history.

(56) References Cited

U.S. PATENT DOCUMENTS

| 6,870,517 | B1  | 3/2005  | Anderson |
| 8,620,269 | B2  | 12/2013 | Johar et al. |
| 8,723,729 | B2  | 5/2014  | Desai et al. |
| 2003/0233567 | A1* | 12/2003 | Lynn ................... H04L 41/0893 726/23 |
| 2004/0203910 | A1  | 10/2004 | Hind et al. |
| 2005/0020244 | A1* | 1/2005  | Chang ..................... H04K 3/41 455/410 |
| 2013/0347058 | A1  | 12/2013 | Smith et al. |
| 2014/0125453 | A1  | 5/2014  | McIntyre et al. |

* cited by examiner

*Primary Examiner* — Tu X Nguyen
(74) *Attorney, Agent, or Firm* — Oblon, McClelland, Maier & Neustadt, L.L.P.

(57) ABSTRACT

A device for limiting an extent of a wireless network service is provided. The device includes a directional antenna disposed at or near an intended boundary of the wireless network service, and a signal generator configured to drive the directional antenna to transmit a jamming signal in a direction substantially parallel to or away from a closest portion of the intended boundary of the wireless network service. The jamming signal degrades the quality of a wireless network signal, and has a signal strength equal to or larger than that of the wireless network signal at a preselected location at or near the intended boundary of the wireless network service.

16 Claims, 7 Drawing Sheets

DEVICE AND METHOD FOR LIMITING AN EXTENT OF A WIRELESS NETWORK SERVICE

GRANT OF NON-EXCLUSIVE RIGHT

This application was prepared with financial support from the Saudia Arabian Cultural Mission, and in consideration therefore the present inventor has granted The Kingdom of Saudi Arabia a non-exclusive right to practice the present invention.

BACKGROUND

Wireless networks are the most prevalent among users of the Internet or private networks. The wireless network service provides a cost-effective way to access the networks. However, the wireless network service has some disadvantages as well. One of the disadvantages is the difficulty in controlling an extent of a wireless network service.

For example, to provide a wireless network service within a building, one or more wireless access points may be arranged over an area of the building where the wireless network service is provided. The wireless access points are set up so that any mobile device can communicate with the wireless access points as long as the mobile device is located inside the building.

Concrete walls of the building usually function as electromagnetic shielding members against the wireless network signals whereas glass windows are nearly transparent to the wireless network signals. Thus, in practice, the strengths of wireless network signals do not drop down uniformly along the boundary of the building, and some of the wireless network signals may leak across the boundary of the building. This makes it difficult to limit the extent of a wireless network service and confine the wireless network signals inside an intended boundary of a wireless network service. This may pose security concerns such as eavesdropping and an out-of-boundary connection to a device located outside the intended boundary of a wireless network service.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to one aspect of the present disclosure, a device for limiting an extent of a wireless network service is provided. The device includes a directional antenna disposed at or near an intended boundary of the wireless network service, and a signal generator configured to drive the directional antenna to transmit a jamming signal in a direction substantially parallel to or away from a closest portion of the intended boundary of the wireless network service. The jamming signal degrades the quality of a wireless network signal, and has a signal strength equal to or larger than that of the wireless network signal at a preselected location at or near the intended boundary of the wireless network service.

The device allows forming an artificial electromagnetic interference zone of the jamming signal outside the intended boundary of the wireless network service, and preventing a requester that sends a new connection request from connecting to the wireless network service when the requester is located outside the intended boundary of the wireless network service. Accordingly, the device provides for limiting the extent of a wireless network service.

According to another aspect of the present disclosure, a method for limiting an extent of a wireless network service is provided. The method includes transmitting a jamming signal from a location at or near an intended boundary of the wireless network service in a direction substantially parallel to or away from a closest portion of the intended boundary of the wireless network service. The jamming signal degrades the quality of a wireless network signal, and has a signal strength equal to or larger than that of the wireless network signal at a preselected location at or near the intended boundary of the wireless network service.

As is the case with the foregoing device, the method also provides for limiting the extent of a wireless network service.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
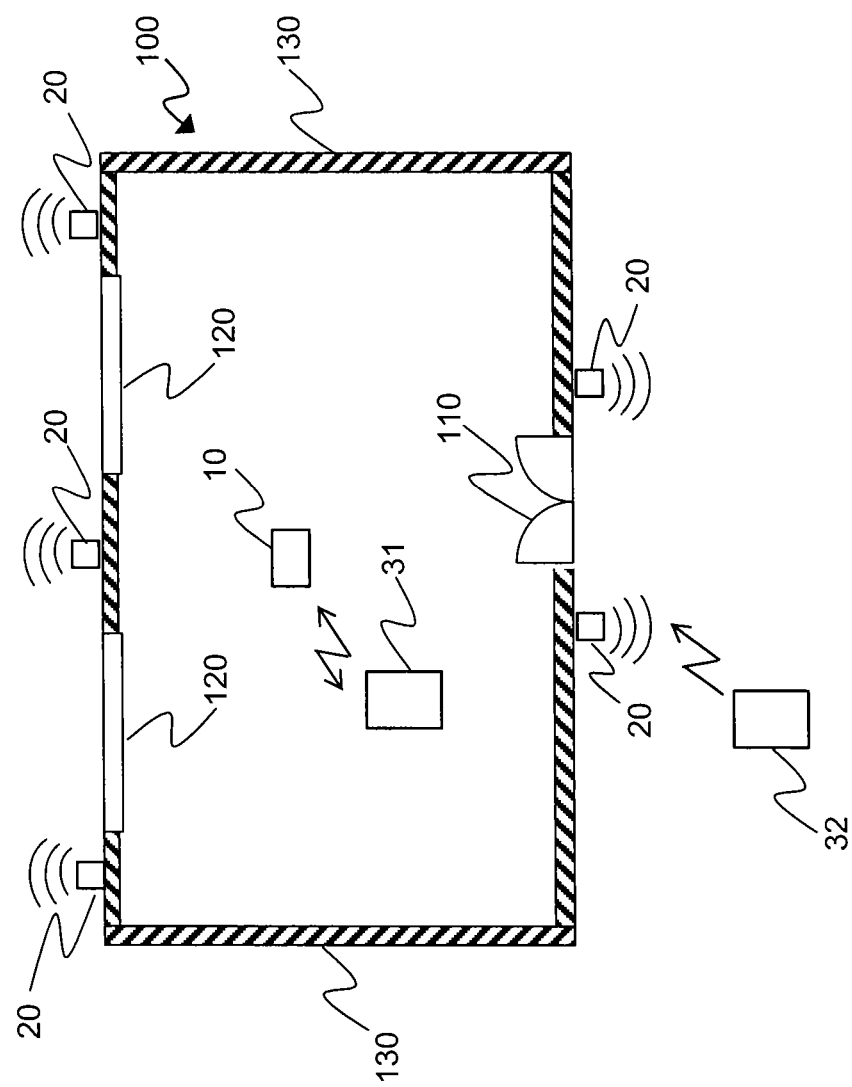
FIG. 1 is a plan view of a building in which a wireless network system according to one embodiment is installed.

Referring now to the drawings, wherein like reference numerals designate identical or corresponding parts throughout the several views.

FIG. 1 is a plan view of a building 100 in which a wireless network system according to one embodiment is installed. The building 100 has an entrance door 110, windows 120, and walls 130. The wireless network system includes a wireless network access point 10 that allows a mobile device 31 to access a public network or a private network for exchanging data using radio waves when the mobile device 31 is located inside the building 100. In the present embodiment, it is assumed that a floor/level of the building 100 is an intended area in which the wireless network service is provided.

The mobile device 31 may be any portable device equipped with wireless communication capability, and may be, for example, a smartphone, a tablet computer, a laptop computer or the like.

The wireless network system further includes a plurality of jammer antennas 20. Each jammer antenna 20 transmits a jamming signal to degrade the quality of wireless network signals and reduce signal-to-noise ratio (SNR) at an area outside the building 100 to prevent a mobile device 32, which is located outside the building 100, from connecting the wireless network service across an intended boundary of the wireless network service.

The jamming signal may be any electromagnetic wave or waves that degrade the quality of the wireless network signals, and may include, for example, but not limited to, electric or electromagnetic noise or a high frequency electromagnetic radiation at a frequency different from the wireless network signal frequencies.

The jammer antenna 20 is a directional antenna, and forms an artificial electromagnetic interference zone in front of the directional antenna 20, where the reception quality of the wireless network signals is degraded. Arranging such jammer antennas 20 as illustrated in FIG. 1 allows for collectively forming a buffer zone around the building 100 and limiting the extent of the wireless network service.

The jammer antenna 20 may be any form of directional antenna. For example, the jammer antenna 20 may include a feed antenna and a reflector or may be a vertical antenna positioned in front of a signal-reflecting member fixed on a wall of the building 100.

The signal-reflecting member may be a pole, a plate, a sheet, or a paint made of or including a metallic material such as aluminum or any other material capable of reflecting electromagnetic waves.

The jammer antennas 20 may be fixed close to the entrance door 110 and the windows 120 through which the network signal may easily passes. When the walls 130 are made of concrete, the walls are less transparent to the wireless network signals compared with the windows 120 made of glass that is more transparent to the wireless signal. Alternatively, the jammer antennas 20 may be additionally fixed near the walls 130 to prevent highly sensitive eavesdropping across the wall 130.

As described above, the jammer antennas 20 limit the extent of the wireless network service, which is the inner space of the building 100 in the present embodiment. An appropriate arrangement of the jammer antennas 20 provides for confining the wireless network to an intended shape.

In one embodiment, the strength of the jamming signal can be set so that the SNR at each one of a plurality of preselected locations outside the building 100 become equal to one or less. This is because a connection to a mobile device located inside the artificial electromagnetic interference zone formed in front of each jammer antenna 20 may be prevented or the data transfer rate to the mobile device may be greatly reduced when SNR is equal to one or less. The values of SNR at the preselected locations may be measured in advance, and the strength of the jammer antenna 20 may be adjusted in advance accordingly.

Although only one wireless access port 10 is included in the wireless network system illustrated in FIG. 1, the wireless network system may include a plurality of wireless access points for providing the wireless network service.

Figure 2:
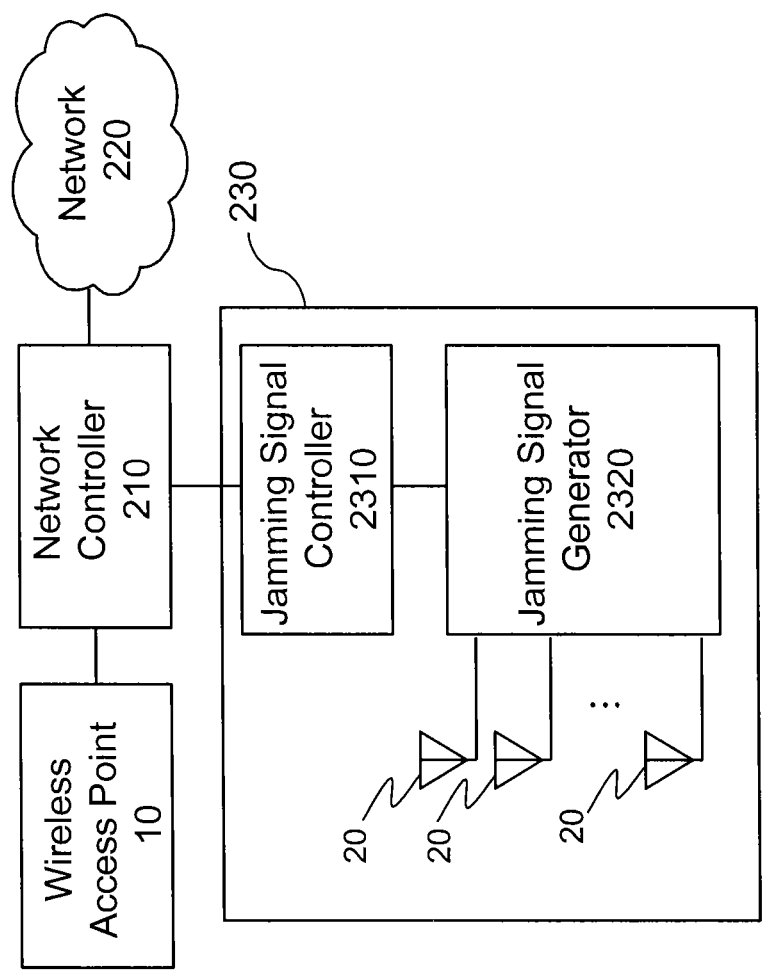
FIG. 2 is an exemplary block diagram of the wireless network system according to one embodiment.

FIG. 2 is an exemplary block diagram of the wireless network system in the present embodiment. The wireless network system includes the foregoing wireless access point 10, a network controller 210, a network 220, and a wireless network extent-limiting device 230.

The network controller 210 may be, for example, such as an Intel Ethernet PRO network interface card from Intel Corporation of America, for interfacing with the network 220. As can be appreciated, the network 220 can be a public network, such as the Internet, or a private network such as an LAN or WAN network, or any combination thereof and can include PSTN or ISDN sub-networks. The network 220 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The wireless network extent-limiting device 230 includes a plurality of the foregoing jammer antennas 20, a jamming signal controller 2310, and a jamming signal generator 2320. The jamming signal generator 2320 is coupled to the jammer antennas 20. The jamming signal generator 2320 drives the jammer antennas 20 to transmit the jamming signal. The jamming signal controller 2310 is coupled to the jamming signal generator 2320 and the network controller 210. The jamming signal controller 2310 controls the jamming signal generator 2320 based on information obtained from the network controller 210, and instructs the network controller 210 to prevent a connection to a mobile device when the mobile device is located outside the intended boundary of the wireless network service.

The wireless network extent-limiting device 230 may limit the extent of the wireless network service in a plurality of ways. The first way is to form the buffer zone around the intended boundary of the wireless network service as described above to prevent a mobile device from connecting to the wireless network service when the mobile device is located outside the intended boundary. Here, the plurality of jammer antennas 20 can be configured via the jamming signal controller 2310 to transmit the jamming signal whenever the wireless network service is available. Thus, in response to detecting wireless signals from a wireless access point 10 the jamming signal controller 2310 may transmit signals to the jamming signal generator 2320 to drive the jammer antennas 20 to transmit jamming signals. Alternatively, or in addition to, the jamming signal controller may be configured to instruct the jamming signal controller 2310 to activate the jamming signal generator 2320 at predetermine intervals or at preset times during the day. Further, as weak signals generated by a wireless access point 10 may not be enough to excessively penetrate through walls 130, the jamming signal controller 2310 may be configured to determine a signal strength of the wireless access point and only cause the jamming signal generator 2320 to activate the jammer antennas 20 when the signal strength is above a predetermined threshold. This threshold can be set based on materials known to be included in the walls 130 such as concrete or other construction materials. This may provide for the saving of energy when it is unlikely that signals generated by the wireless access point 10 will exceed the confines of a particular floor, room or boundary.

Specifically, in one embodiment, the jamming signal controller 2310 controls the powers of the jammer antennas 20 through the jamming signal generator 2320 so as to reduce SNR of the network signals down to, for example, one or less at the preselected locations outside the building 100. For example, the jammer antenna 20 may transmit the jamming signal with the signal strength equal to or larger than that of the wireless network signal at or near the intended boundary of the wireless network service. When the jamming signal and the network signal have substantially the same strength, the network signal drops out continuously, making it difficult to maintain the connection to the wireless network service.

The first way may be implemented easily and inexpensively. The first way enables to limit the extent of a wireless network service in an existing wireless network system.

The second way is to use the jamming signal to determine whether a mobile device requesting a new connection is located inside or outside the intended boundary of the wireless network service, and allow the connection when the mobile device is determined as being inside the intended boundary of the wireless network service, thereby in effect limiting the extent of the wireless network service.

Figure 3:
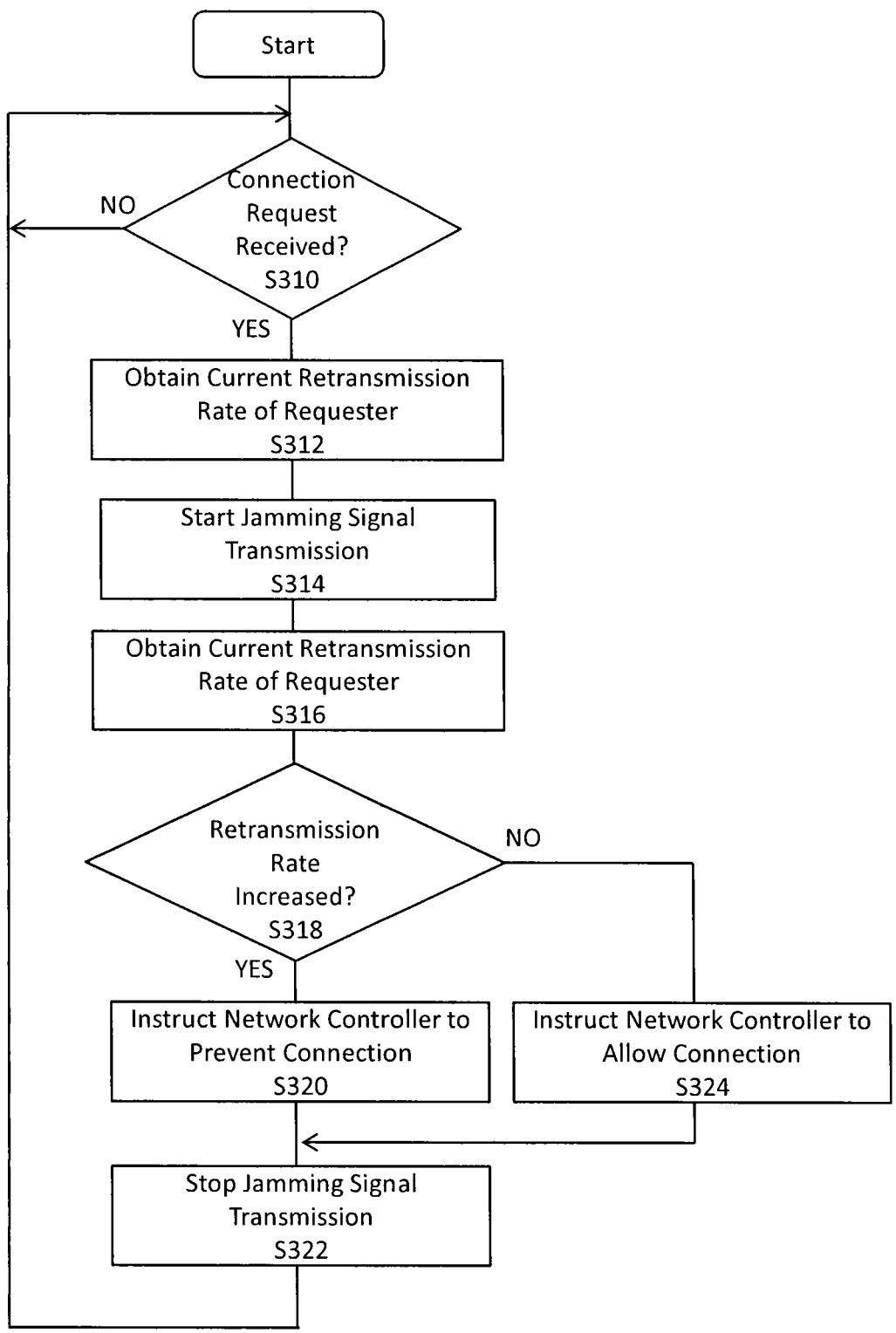
FIG. 3 is an algorithmic flow chart of a jamming signal control process according to one embodiment.

FIG. 3 is an algorithmic flow chart of a jamming signal control process that is an exemplary implementation of the second way. The jamming signal control process starts when the network controller 210 receives a new connection request from a mobile device at step S310. For example, the jamming signal controller 2310 may be configured to receive a notification from the network controller 210 when the network controller 210 receives a new connection request from a mobile device.

When the new connection request is received (Yes at step S310), the process proceeds to step S312. There, the jamming signal controller 2310 obtains the current retransmission rate on a connection to the requester, the mobile device that sends the connection request. Note that the mobile device is allowed to have a temporary connection to the wireless network service until its location is determined.

Subsequently, at step S314, the jamming signal controller 2310 controls the jamming signal generator 2320 to start a jamming signal transmission from one or more of the jammer antennas 20. The strength of the jamming signal may be set arbitrary as long as the change in retransmission rate due to the jamming signal transmission is distinguishable between a mobile device located inside the intended boundary of the wireless network service and a mobile device outside.

In one embodiment, all jammer antennas 20 may be activated or the jamming signal controller 2310 may receive (or detect) information related to the location of the mobile device. At this point, the jamming signal controller 2310 may only control jamming signal controller 2310 to cause the jamming signal generator 2320 to generate signals via one or more particular jammer antennas 20 that are located in close proximity to the location of the mobile device.

When the building 100 is isolated from other buildings or structures, larger artificial electromagnetic interference zones of the jamming signal may be permissible to form around the building 100. In such a case, the strength of the jamming signal may be set, for example, so that the jamming signal and the wireless network signal have the same or substantially the same signal strength at a location at or near each jammer antenna 20. When there are other buildings around the building 100, it is possible to use smaller jamming signal strength.

Subsequently, at step S316, the jamming signal controller 2310 obtains again the current retransmission rate on the connection to the mobile device.

At step S318, two values of the retransmission rate obtained at step S312 and step S316 are compared and determined whether the retransmission rate increases after the start of jamming signal transmission. During the jamming signal transmission, the mobile device located outside the intended boundary of the wireless network service is exposed to the jamming signal radiation. This causes a frequent drop-out of the wireless network signal and an increase in retransmission rate. Accordingly, the mobile device may be determined as being outside the intended boundary of the wireless network service when the retransmission rate increases after the start of jamming signal transmission.

When the retransmission rate increases after the start of jamming signal transmission (Yes at step S318), it is determined that the mobile device locates outside the intended boundary of the wireless network service, and the process proceeds to step S320. At step S320, the jamming signal controller 2310 instructs the network controller 210 to terminate the connection to the mobile device. Further, the MAC address of the terminated mobile device is obtained and stored in the network controller 210 for filtering out by MAC address filtering to prevent the terminated mobile device from connecting to the wireless network service. Subsequently, at step S322, the jamming signal transmission is stopped and the process returns to step S310.

When the retransmission rate does not increase after the start of jamming signal transmission (No at step S318), it is determined that the mobile device is located inside the intended boundary of the wireless network service, and at step S324 the jamming signal controller 2310 instructs the network controller 210 to maintain the connection to allow the mobile device to connect to the wireless network.

Although the retransmission rate is used in this example, any other parameter or index utilized in monitoring wireless network activity may be used in place of the retransmission rate, provided that such a parameter or index can indicate directly or indirectly a change in the quality of connection to an individual mobile device. For example, a signal strength of the connection between the mobile device and the network is lower than a predetermined threshold, it may be determined by the jamming signal controller 2310 that the mobile device is located outside of the boundary of the wireless access point established via the jammer antennas 20. This could be determined by comparing the signal strength to an average threshold determined based on mobile devices already connected to the network and within the established boundaries.

In the second way, the jamming signal is used only for determination of the location of a mobile device requesting a new connection. This reduces a time of the jamming signal transmission, and thus reduces any possible electromagnetic interference to neighboring areas.

It is possible that a user of the terminated mobile device is a legitimate user of the wireless network service and turned on his/her mobile device before entering the wireless network area by mistake. To cope with such a situation, in another embodiment, the network controller 210 may store a list of MAC addresses of mobile devices of legitimate users in advance, and the MAC address of the terminated mobile device may be filtered out only when the MAC address of the terminated mobile device is not included in the list of MAC addresses of mobile devices of legitimate users.

In another embodiment, instead of obtaining the retransmission rate before and after the start of jamming signal transmission, the retransmission rate may be continuously monitored while the jamming signal transmission is being modulated in strength. A mobile device may be determined as being outside the intended boundary of the wireless network service when a measured retransmission rate change correlates with the jamming signal transmission modulation.

Figure 4:
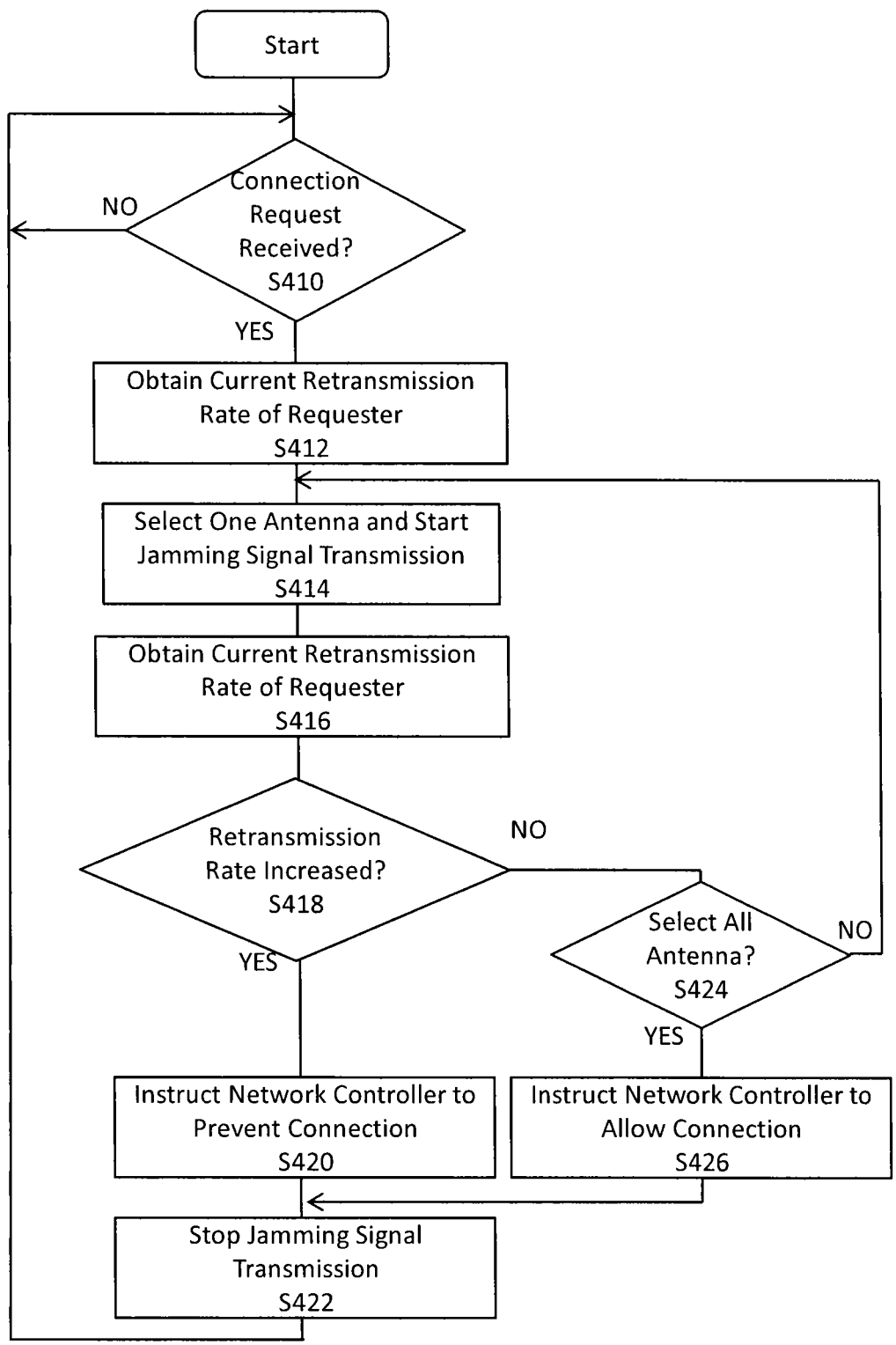
FIG. 4 is an algorithmic flow chart of a jamming signal control process according to another embodiment.

FIG. 4 is an algorithmic flow chart of the jamming signal control process according to another embodiment. In this embodiment, the jamming signal is sequentially transmitted from the respective jammer antennas 20 to further reduce possible interference effects of the jamming signal.

The jamming signal control process of FIG. 4 starts when the jamming signal controller 2310 detects that the network controller 210 receives a new connection request from a mobile device at step S410. When the new connection request is received (Yes at step S410), the process proceeds to step S412. There, the jamming signal controller 2310 obtains the current retransmission rate on a connection to the requester, the mobile device that sends the connection request. Note that the mobile device is allowed to have a temporary connection to the wireless network until the location of the mobile device is determined.

Subsequently, at step S414, the jamming signal controller 2310 selects one of the plurality of the jammer antennas 20 and controls the jamming signal generator 2320 to start a jamming signal transmission from the selected jammer antenna 20. Subsequently, at step S416, the jamming signal controller 2310 obtains again the current retransmission rate on the connection to the mobile device.

At step S418, two values of the retransmission rate obtained at step S412 and step S416 are compared and determined whether the retransmission rate increases after the start of jamming signal transmission. When the retransmission rate increases after the start of jamming signal transmission (Yes at step S418), it is determined that the mobile device locates outside the intended boundary of the wireless network service, and the process proceeds to step S420. At step S420, the jamming signal controller 2310 instructs the network controller 210 to terminate the connection to the mobile device. Further, the MAC address of the terminated mobile device is obtained and stored in the network controller 210 for filtering out by MAC address filtering to prevent the terminated mobile device from connecting to the wireless network. Subsequently, at step S422, the jamming signal is turned off and the process returns to step S410.

When the retransmission rate does not increase after the start of jamming signal transmission (No at step S418), it is further determined whether all the jammer antennas 20 are already selected at step S424. When all the jammer antennas 20 are selected (Yes at step S424), it is determined that the mobile device is located inside the intended boundary of the wireless network service, and at step S426 the jamming signal controller 2310 instructs the network controller 210 to maintain the connection to allow the mobile device to connect to the wireless network.

When all the jammer antennas 20 are not selected (No at step S424), the process returns to step S414 to select another jammer antenna 20 that has not been selected and start another session of jamming signal transmission.

In one embodiment, the jamming signal may be transmitted only from one jammer antenna 20 at a time. This reduces possible interference effects that may affect neighboring areas.

Further, in one embodiment, it is possible to identify the individual jammer antenna 20 that directly caused the increase in retransmission rate. Based on such information, the location of a mobile device outside the intended boundary of the wireless network service may be estimated. For example, in FIG. 1, the mobile device 32 is located in front of the jammer antenna 20 at left hand side of the entrance door 110. Thus, when the jamming signal is transmitted from that jammer antenna 20, it is highly possible that the retransmission rate increases on a connection to the mobile device 32. Whereas, when the jamming signal is transmitted from the jammer antenna at right hand side of the entrance door 110, it is less possible that the retransmission rate increase. The location of the mobile device 32 is estimated to be somewhere inside the artificial electromagnetic interference zone formed in front of the jammer antenna 20 that directly caused the increase in the retransmission rate.

The jammer antenna 20 that caused the increase in retransmission rate may be kept turned on for a preset period for preventing any additional attempts of out-of-boundary accesses from the same area. Further, the information may be collected over a preset period to identify an area or areas where the out-of-boundary access occurs frequently. This enables to improve the security of wireless network service.

Figure 5:
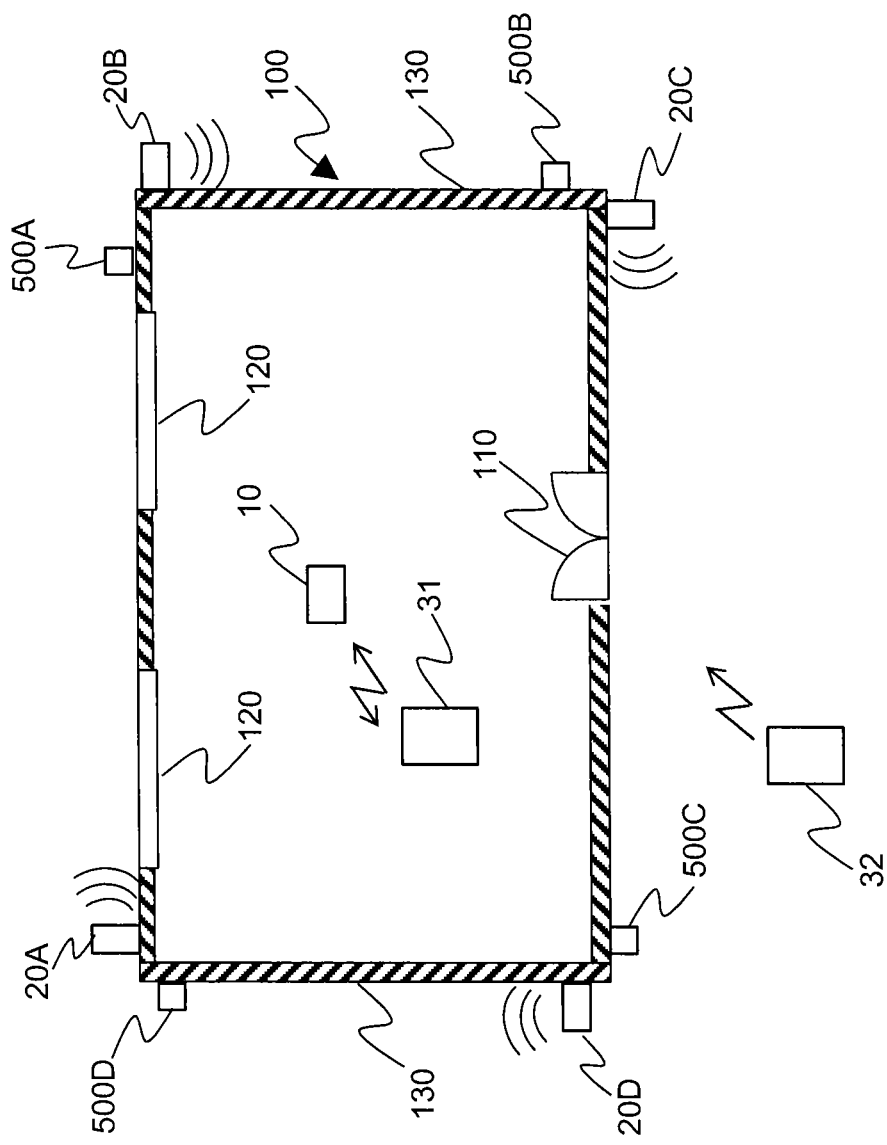
FIG. 5 is a plan view of a building in which a wireless network system according to another embodiment is installed.
Figure 6:
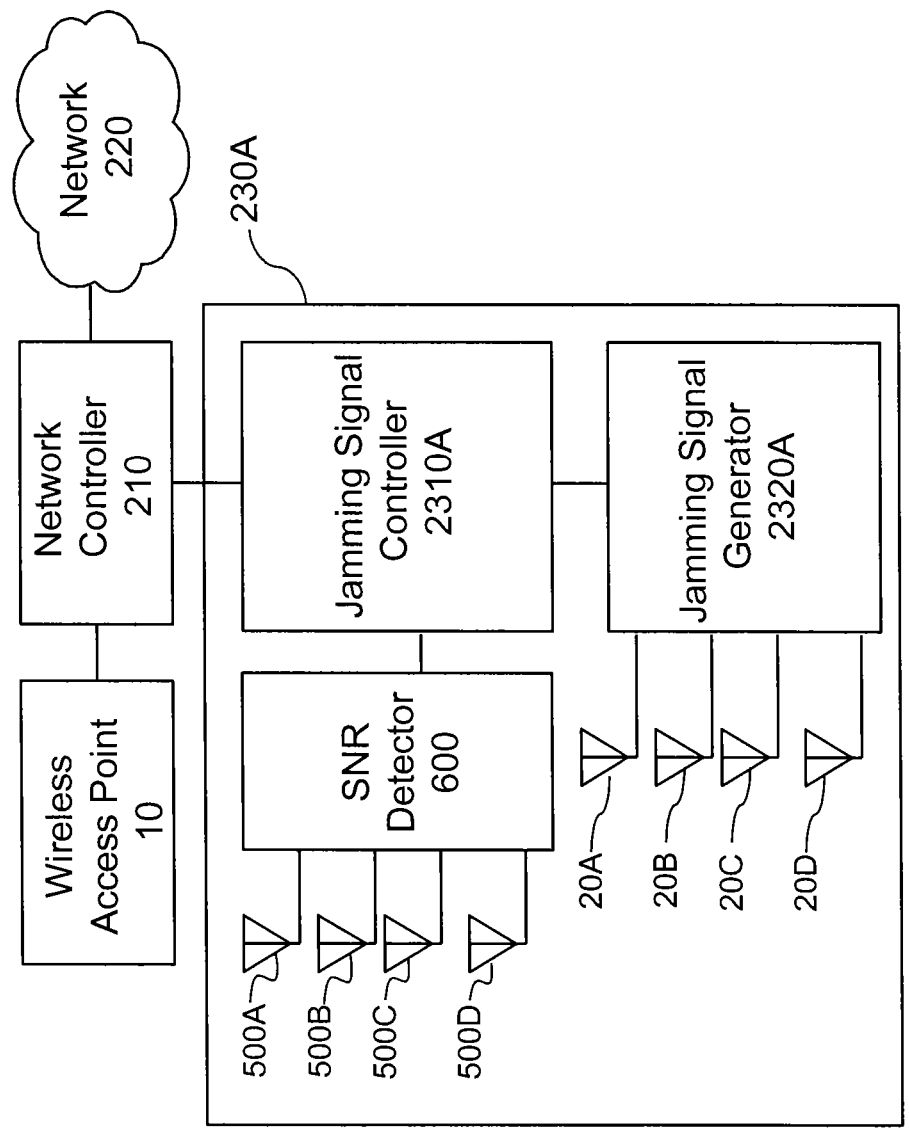
FIG. 6 is an exemplary block diagram of the wireless network system according to another embodiment.

Referring to FIG. 5 and FIG. 6, a wireless network system according to another embodiment is described. The present embodiment differs from the foregoing embodiment of FIG. 1 and FIG. 2 in that a wireless network extent limiting device 230A of the present embodiment further includes a plurality of monitoring antennas 500A to 500D for monitoring both the strengths of jamming signals transmitted from a plurality of jammer antennas 20A to 20D and wireless network signals in use for the wireless network service.

FIG. 5 is a plan view of the building 100 in which the wireless network system according to the present embodiment is installed. The plurality of jammer antennas 20A to 20D are directional antennas and fixed to respective walls of the building 100 in such a way that their antenna directions substantially parallel to their closest walls of the building 100, which form an intended boundary of the wireless network service. The plurality of monitoring antennas 500A to 500D are fixed to respective walls of the building 100, and measures the strengths of the jamming signals and the wireless network signals at their locations.

FIG. 6 is an exemplary block diagram of the wireless network system according to the present embodiment. The wireless network system includes the wireless access point 10, the network controller 210, and the network 220 for providing users a wireless network service. The wireless network system further includes a wireless network extent-limiting device 230A.

The wireless network extent-limiting device 230 includes the jammer antennas 20A to 20D, the monitoring antennas 500A to 500D, a SNR detector 600, a jamming signal controller 2310A, and a jamming signal generator 2320A.

The SNR detector 600 receives signals from the monitoring antennas 500A to 500D, calculates the values of SNR at the respective monitoring antenna locations, and outputs calculated values of SNR to the jamming signal controller 2310A. The jamming signal controller 2310A receives the calculated values of SNR from the SNR detector 600, and controls the jamming signal generator 2320A based on the calculated values of SNR received so as to prevent an out-of-boundary connection to a mobile device located outside the intended boundary of the wireless network service.

The jamming signal controller 2310A may control the jamming signal generator 2320A to drive the respective jammer antennas 20A to 20D so that the artificial electromagnetic interference zones formed in front of the jammer antennas 20A to 20D substantially surround the building 100. Specifically, the jamming signal controller 2310A may control the jamming signal generator 2320A to drive each jammer antenna so that the value of SNR at the location of the corresponding monitoring antenna fixed on the same wall is equal to one or less.

This enables to ensure that the value of SNR outside the intended boundary of the wireless network service is sufficiently low to prevent the connection from outside the building 100.

Alternatively, the jamming signal controller 2310 may perform the jamming signal control process as illustrated in FIG. 3 or FIG. 4 to identify a mobile device outside the intended boundary of the wireless network service and prevent connection thereto.

Figure 7:
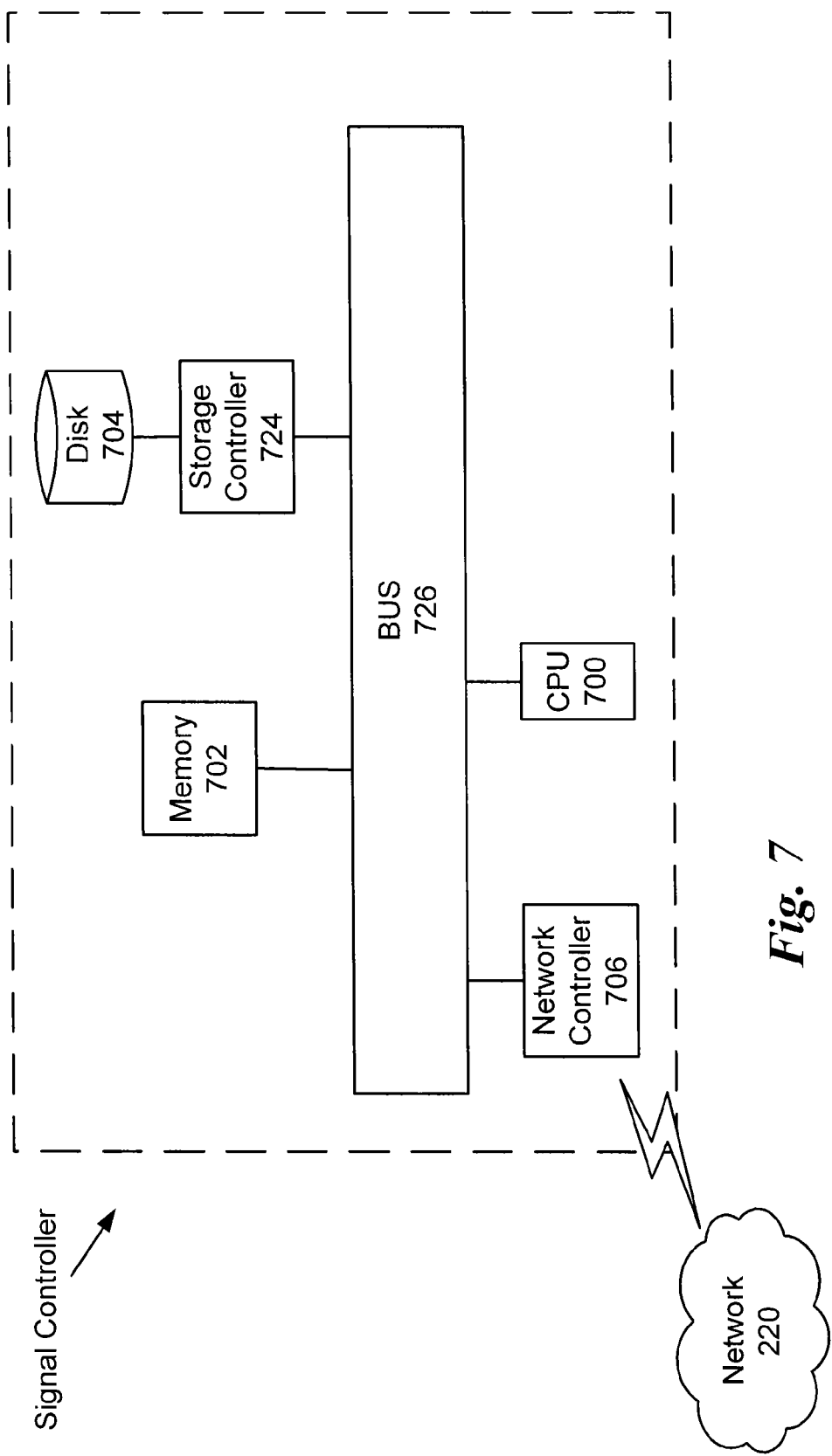
FIG. 7 is an hardware diagram of a signal controller according to an embodiment 721.

Next, a hardware description of the jamming signal controller 2310 and/or jamming signal controller 2310a, hereafter "signal controller," according to exemplary embodiments is described with reference to FIG. 7. In FIG. 7, the signal controller includes a CPU 700 which performs the processes described above. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the signal controller communicates, such as a server or computer.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The signal controller in FIG. 7 may also include a network controller 706, such as an Intel Ethernet PRO network interface card from Intel Corporation of America, for interfacing with network 220 or network controller 210. As can be appreciated, the network 220 can be a public network, such as the Internet, or a private network such as an LAN or WAN network, or any combination thereof and can also include PSTN or ISDN sub-networks. The network 220 can also be wired, such as an Ethernet network, or can be wireless such as a cellular network including EDGE, 3G and 4G wireless cellular systems. The wireless network can also be WiFi, Bluetooth, or any other wireless form of communication that is known.

The general purpose storage controller 724 connects the storage medium disk 704 with communication bus 726, which may be an ISA, EISA, VESA, PCI, or similar, for interconnecting all of the components of the signal controller.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A device for limiting an extent of a wireless network service, the device comprising:
   a directional antenna disposed at or near an intended boundary of the wireless network service;
   a signal generator configured to drive the directional antenna to transmit a jamming signal in a direction substantially parallel to or away from a portion of the intended boundary of the wireless network service; and
   a controller coupled to a wireless network system that provides the wireless network service, the controller
   obtaining a retransmission rate on a connection to a requester that sends a new connection request before and after the start of jamming signal transmission from the wireless network system, and
   instructing the wireless network system to terminate and prevent the connection to the requester when the retransmission rate increases after the start of jamming signal transmission,
   wherein the jamming signal degrades quality of a wireless network signal, and has a signal strength equal to or larger than that of the wireless network signal at a preselected location at or near the intended boundary of the wireless network service.

2. The device according to claim 1 wherein
   the controller is coupled to the signal generator to control a jamming signal transmission, and controls the signal generator to start the jamming signal transmission in response to a reception of the new connection request at the wireless network system.

3. The device according to claim 2 further comprising:
   a plurality of directional antennas disposed at or near the intended boundary of the wireless network service, wherein
   the controller controls the signal generator to sequentially drive each one of the plurality of directional antennas to perform a jamming signal transmission session, obtains the retransmission rate on a connection to a requester that sends the new connection request before and after starting the jamming signal transmission session from the wireless network system, and instructs the wireless network system to terminate and prevent the connection to the requester when the retransmission rate increases after starting the jamming signal transmission session.

4. The device according to claim 3, wherein when the transmission rate increases after starting the jamming signal transmission session, an additional jamming signal transmission session is performed at one of the plurality of directional antennas that causes the increase in transmission rate after the terminating the connection to the requester.

5. The device according to claim 1, wherein the directional antenna is a vertical antenna positioned in front of a signal-reflecting member fixed on a wall of structure inside which the wireless network service is provided.

6. The device according to claim 1, wherein the directional antenna is disposed at or near a window fixed on a structure inside which the wireless network service is provided.

7. The device according to claim 2, further comprising:
   a monitoring antenna disposed at or near the intended boundary of the wireless network service and configured to receive both the wireless network signal and the jamming signal; and
   a SNR detector coupled to the monitoring antenna and configured to measure a signal-to-noise ratio of the wireless network signal to the jamming signal, wherein
   the controller controls the signal generator to transmit the jamming signal so that the signal-to-noise ratio measured by the SNR detector is one or less.

8. The device according to claim 7, wherein the directional antenna and the monitoring antenna are arranged on a same wall of a structure inside which the wireless network service is provided.

9. The device according to claim 1, wherein
   the wireless network system performs media access control (MAC) address filtering, and
   the controller obtains a MAC address of the requester and instructs the wireless network system to filter out the requester by using the MAC address obtained in the MAC address filtering when the retransmission rate increases after the start of jamming signal transmission.

10. The device according to claim 9, wherein
the wireless network signal is transmitted from and received with a wireless access point, and
the directional antenna directs the jamming signal in a direction away from the wireless access point.

11. The device according to claim 1, wherein the directional antenna includes a feed antenna and a reflector and directs the jamming signal substantially parallel to a closest wall of a structure inside which the wireless network service is provided.

12. A wireless network system comprising:
a wireless access point;
a network;
a network controller; and
the device according to claim 1.

13. A method for limiting an extent of a wireless network service, the method comprising:
transmitting a jamming signal, via a directional antenna, from a location at an intended boundary of the wireless network service in a direction substantially parallel to or away from a closest portion of the intended boundary of the wireless network service; and
obtaining a retransmission rate on a connection to a requester that sends a connection request before and after the start of jamming signal transmission, and
terminating the connection to the requester when the retransmission rate increases after the start of jamming signal transmission, wherein
the jamming signal degrades quality of a wireless network signal, and has a signal strength equal to or larger than that of the wireless network signal at a preselected location at the intended boundary of the wireless network service.

14. The method according to claim 13, wherein the step of transmitting a jamming signal starts in response to a reception of the new connection request.

15. The method according to 13, further comprising:
obtaining a MAC address of the requester, and
filtering out the requester using the MAC address obtained by MAC address filtering when the retransmission rate increases after the start of jamming signal transmission.

16. The method according to claim 13, wherein
the step of transmitting a jamming signal starts in response to a reception of a new connection request and includes sequential sessions of jamming signal transmission from each one of a plurality of locations at or near the intended boundary of the wireless network service, and
a connection to a requester that sends the new connection request is terminated when a retransmission rate on the connection to the requester increases after the start of any one of the jamming signal transmission sessions.

* * * * *